(12) United States Patent  
Phely

(10) Patent No.: US 6,364,437 B1
(45) Date of Patent: Apr. 2, 2002

(54) FLEXIBLE TRACK DRIVE DEVICE FOR ALL-TERRAIN VEHICLE

(75) Inventor: Olivier Phely, Sainte Colombe (FR)

(73) Assignee: Otico, Longueville (FR)

( * ) Notice: Subject to any disclaimer, the term of this patent is extended or adjusted under 35 U.S.C. 154(b) by 0 days.

(21) Appl. No.: 09/576,041

(22) Filed: May 23, 2000

(30) Foreign Application Priority Data

May 28, 1999 (FR) ............................................. 99 06805

(51) Int. Cl.[7] ................................................ B62D 55/10
(52) U.S. Cl. ........................ 305/116; 305/124; 305/129
(58) Field of Search ................................ 305/116, 124, 305/125, 129, 130, 136, 137, 138, 142, 131, 165, 167, 177, 178, 184

(56) References Cited

U.S. PATENT DOCUMENTS

| | | | | |
|---|---|---|---|---|
| 758,757 | A | * | 5/1904 | Jones |
| 1,298,022 | A | * | 3/1919 | Dickerson |
| 1,786,430 | A | * | 12/1930 | Kegresse |
| 3,118,709 | A | * | 1/1964 | Case |
| 3,446,303 | A | * | 5/1969 | Trapp |
| 5,433,515 | A | * | 7/1995 | Purcell et al. |

FOREIGN PATENT DOCUMENTS

| | | |
|---|---|---|
| FR | 2711959 | 5/1995 |
| FR | 2768387 | 3/1999 |
| WO | 98/ 16419 | 4/1998 |

* cited by examiner

Primary Examiner—Russell D. Stormer
(74) Attorney, Agent, or Firm—Dennison, Scheiner & Schultz

(57) ABSTRACT

The device comprises at least one track (10) formed from an endless flexible belt (22) fitted on the inside with at least one row of studs (24) situated in the longitudinal direction of the endless belt and spaced at a constant distance apart and each delimited by two transverse faces and two lateral faces, two main wheels (12, 16) and support wheels (20A, 20B, 20C) on which the endless belt rolls, and a guidance element (50) placed between a main wheel (12) and an adjacent support wheel (20C) and comprising rollers (52) able to frame the lateral faces of the studs (24) in order to ensure guidance and stabilization of the endless belt in the region of the guidance element.

12 Claims, 2 Drawing Sheets

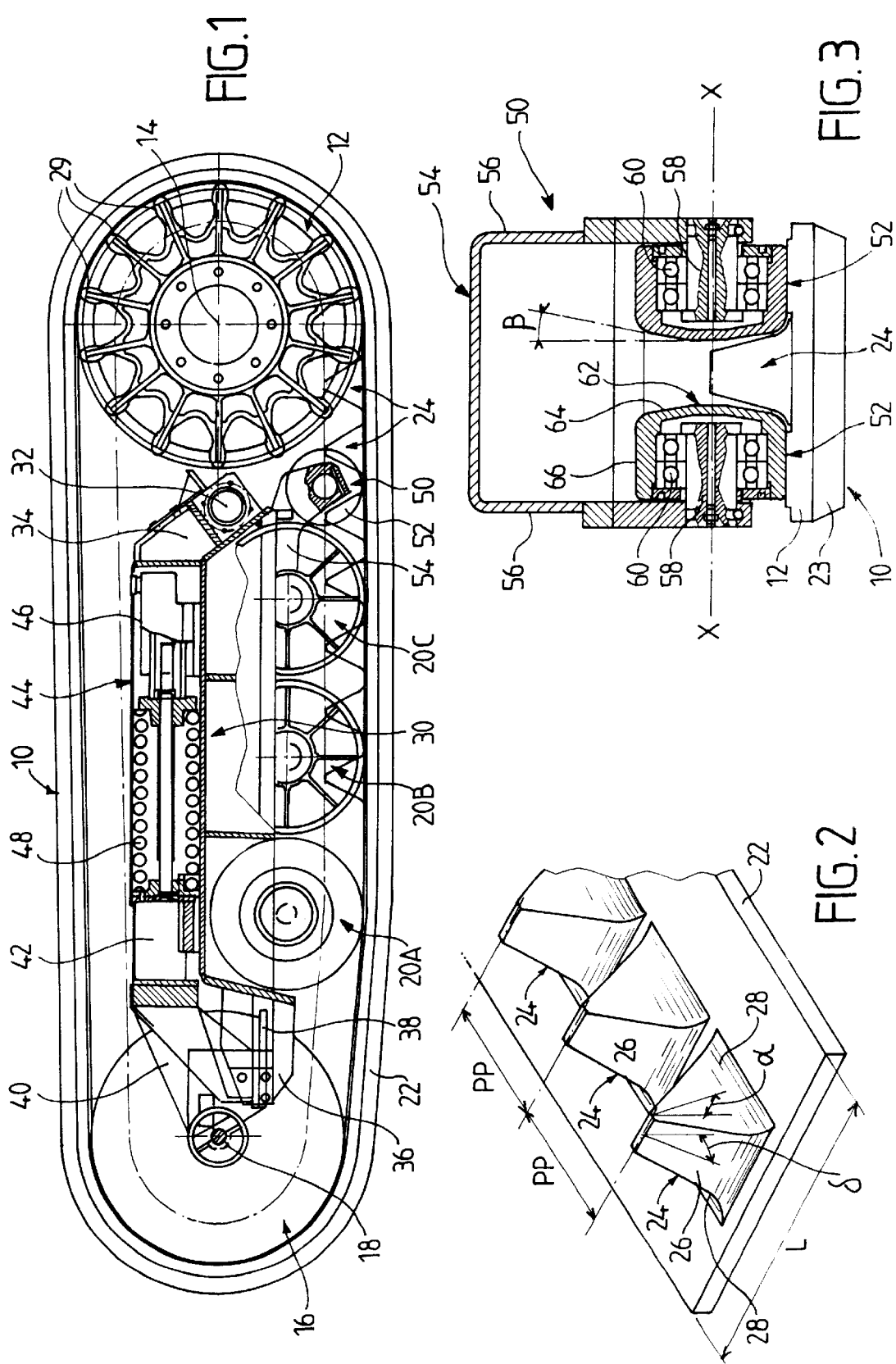

FLEXIBLE TRACK DRIVE DEVICE FOR ALL-TERRAIN VEHICLE

FIELD OF THE INVENTION

The invention concerns track drive devices intended in particular for the propulsion of all-terrain vehicles such as agricultural, vineyard and oyster-farming machines or civil engineering and forestry machines.

BACKGROUND OF THE INVENTION

The invention concerns more particularly a track drive device of the type comprising at least one track formed from an endless flexible belt fitted on the inside with at least one row of studs located in the longitudinal direction of the belt, spaced at a constant distance apart and each delimited by two transverse faces in the transverse direction of the endless belt and by two lateral faces in the longitudinal direction of the endless belt, and two main wheels and support wheels on which the endless belt rolls.

In its patent FR-A-2 711 959 (93 13211), the applicant proposed a drive device of this type in which each stud was approximately shaped as a pyramid, at the base of which was defined at least one rolling slope. The lateral and transverse faces of the stud are flat and form an angle of between 8° and 20° for the lateral faces and between 30° and 40° for the transverse faces respectively in relation to a plane normal to the endless belt of the track.

In its patent FR-A-2 768 387 (97 11398), the applicant proposed a track drive device of the said type comprising particularly advantageous arrangements concerning in particular the main wheels and the support wheels on which the endless belt rolls.

In a track drive device of the said type, the main wheels normally comprise a posterior drive wheel and an anterior non-drive wheel.

Most often the non-drive wheel placed at the rear also serves as a track tensioning wheel and is borne by an oscillating beam which generally carries the support wheels placed between the anterior wheel and posterior wheel.

The drive wheel usually has, close to its median plane and perpendicular to its axis of rotation, a drive zone forming a drive gear for the track studs. This drive zone is generally formed by catches regularly spaced on the wheel periphery intended to enmesh in the empty spaces between the studs. These studs have a selected form facilitating the engagement and disengagement during their meshing with or release from the drive wheel.

Drive devices of this type are intended for use on vehicles which may be required to work in particularly difficult conditions, in particular on undulating terrain.

In extreme conditions, for example when working on steep gradients and cambers, the track may be subjected to considerable lateral forces tending to dislodge the track in particular from the posterior drive wheel but also from the anterior non-drive wheel.

SUMMARY OF THE INVENTION

The applicant has consequently considered the problem of improving the guidance and stabilization of the endless belt in particular in the region close to a main wheel.

To this end he proposes a track drive device of the type defined in the introduction which also comprises a guidance element placed between a main wheel and an adjacent support wheel and comprising rollers able to frame the lateral faces of the studs in order to ensure guidance and stabilization of the endless belt in the region of the guidance element.

This guidance element which can also be called a "stabilizer element" therefore lies in the free space between a main wheel and the support wheel immediately adjacent to this.

Because this guidance element comprises rollers which frame the lateral faces of the studs, the result is an improvement in guidance of the endless belt in the region between this main wheel and this adjacent guide wheel.

Consequently even under extreme conditions, the track remains perfectly guided and stabilized and does not risk being dislodged from the main wheel and distorted.

In an embodiment of the invention, the guide element is placed between a main drive wheel and an adjacent support wheel.

In another embodiment of the invention, the guide element is placed between a non-driven main wheel and an adjacent support wheel.

The invention applies in particular to a device in which one of the main wheels and the support wheels are borne by an oscillating beam mounted pivotally about a shaft. In this case it is advantageous for the guidance element to be firmly attached to the said beam and thus be carried directly or indirectly by the beam.

The invention also applies to the particular case where the support wheels are grouped in pairs, each pair of wheels being borne on a rocker articulated on the oscillating beam.

In such cases it is advantageous for the guidance element to be borne by the rocker.

The guidance element can be located at an end of the oscillating beam which is close to the articulation shaft or at an end of the oscillating beam which is remote from the articulation shaft.

Naturally it is possible for the guidance element to be borne in another way for example directly by the framework supporting the track drive device.

In a preferred embodiment the control element comprises two coaxial rollers mounted loosely about a shaft and spaced apart.

These rollers preferably have their respective heads located in opposition, each able to rest against the two lateral faces of the studs.

According to another characteristic of the invention the heads of the rollers are shaped as a function of the shape of the lateral faces of the studs.

Thus it is advantageous for the heads of the rollers to have in general a truncated form and each be connected to a cylindrical skirt.

When the side faces of the studs are generally flat, forming an acute angle in relation to a plane normal to the endless belt, it is advantageous that the truncated parts of the roller heads form a less acute angle so as to promote contact of the rollers with the lateral faces of the studs in a region close to the endless belt at the base of the studs.

In other words this allows a greater play between the head of the stud and the roller than between the base of the stud and the roller.

In an embodiment of the invention, the rollers are mounted on two coaxial pivots borne by two arms respectively of a bracket.

BRIEF DESCRIPTION OF THE DRAWINGS

In the description which follows, given merely as an example, reference is made to the attached drawings in which:

FIG. 1 is a side view of the drive device according to a first embodiment of the invention;

FIG. 2 is a partial perspective view of a track able to form part of the device in FIG. 1;

FIG. 3 is a transverse cross section of the guidance element forming part of the device in FIG. 1;

DETAILED DESCRIPTION OF THE PREFERRED EMBODIMENTS

Figure 4:
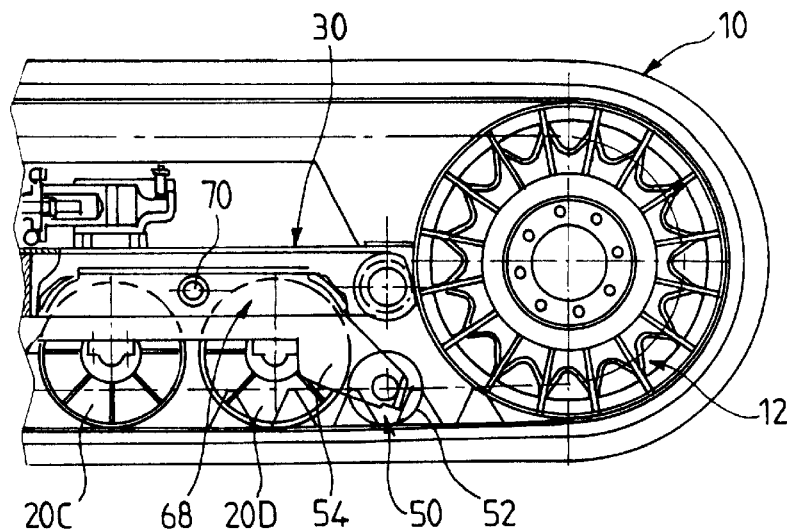
FIG. 4 is a partial side view of a device according to a second embodiment of the invention.

The drive device shown in FIG. 1 comprises a flexible track 10 rolling around two main wheels: a posterior drive wheel 12 mounted to rotate about a shaft 14 and an anterior non-drive wheel 16 mounted to rotate about a shaft 18. The track 10 also rolls around three support wheels 20A, 20B and 20C of smaller diameter than the main wheels 12 and 16.

The track 10 is formed from a flexible endless belt 22 advantageously produced from an elastomer material for example based on natural rubber and internally strengthened by reinforcements (not shown).

The endless belt 22 has on the outside a rolling surface advantageously fitted with lugs 23 (FIG. 3). On the inside it is fitted with a row of studs 24 arranged in the longitudinal direction of the belt and spaced at a constant distance PP apart (FIG. 2). The studs 24 are each delimited by two transverse faces 26 extending in the transverse direction L of belt 22 and by two lateral faces 28 extending in the longitudinal direction of the endless belt 22. The transverse faces 26 are flat and form an angle $\delta$ between 30° and 40° in relation to a plane normal to the track belt whereas the lateral faces 28 are flat and form an angle $\alpha$ between 8° and 20° in relation to a plane normal to the track belt.

The transverse faces 26 and the lateral faces 28 of each stud each connect to the endless belt via a rounded surface.

The drive wheel 12 is of the type described in the French patents cited above. It comprises two rims connected together at regular intervals by drive catches 29 arranged parallel to each other on the periphery of the wheel and parallel to the generating lines of the wheel. The catches 29 are intended to enmesh in the clear spaces delimited between the studs 24.

An all-terrain vehicle comprises two drive devices of symmetrical configuration placed respectively on the right and left sides of the vehicle and carried by an appropriate framework.

As FIG. 1 shows, the device also comprises an oscillating beam 30 mounted pivotally about a shaft 32 (generally on the vehicle framework) which extends parallel to the respective shafts 14 and 18 of wheels 12 and 16.

The beam 30 has a posterior end 34 forming a pivot and an anterior end 36 arranged to carry a slide 38 on which can slide a support fork 40 bearing shaft 18 of wheel 16. The support fork 40 is attached to a linking element 42 borne by a tensioning and damper mechanism 44 which is supported by the beam 30. This mechanism 44 comprises an actuator 46 and a spring 48 and allows tensioning of the fork 40 such that the anterior wheel 16 acts as a tensioning wheel for track 10. Also spring 48 acts as a damper for the track when this rolls over obstacles. Support wheels 20A, 20B and 20C are borne directly by the oscillating beam 30. The general structure of such a device is known from patent FR-A-2 768 387 (97 11398) cited above.

According to the invention the device also comprises a guidance element 50 which in the embodiment in FIG. 1 is placed between the drive wheel 12 and the support wheel 20C immediately adjacent to this. The guide element 50 (FIGS. 1 to 3) comprises two coaxial rollers 52 mounted loosely about a shaft XX and spaced apart. These rollers are intended to frame the lateral faces 28 of the studs and improve the guidance and stabilization of the track in the region between the drive wheel 12 and the support wheel 20C.

The rollers 52 are carried by a bracket 54 firmly attached to beam 30 (FIG. 1). In the example, this bracket 54 is attached to the posterior end 34 of the beam close to the axis of pivot 32.

The bracket 54 has two parallel branches 56 carrying two pivots 58 respectively on which are mounted rollers 52 via bearings 60. These rollers 52 are mounted in opposition. They each comprise a head 62 with a part 64 of generally truncated form attached to a cylindrical skirt 66.

The truncated part 64 of each of heads 62 forms an acute angle $\beta$ in relation to a plane normal to the endless belt 22, this acute angle $\beta$ being less than the acute angle $\alpha$ formed by each of the lateral faces 28 of the stud with a plane normal to the endless belt.

This promotes a resting of the rollers in the connection zone of the studs 24 with the endless belt 22 i.e. at the base of the studs. As a result there is a play of variable width between the transverse face 28 and the head 62 of the roller, this width being smaller at the base of the stud.

The rollers 52 frame the studs and thus improve the guidance and stabilization of the track in the region between the wheel 12 and the support wheel 20C. These guidance rollers are preferably made of metal. They can have a diameter much smaller than that of the adjacent support wheel which allows the guidance element to be housed in a space of limited dimensions in which it would be impossible to house another support wheel. In the embodiment shown, each of the rollers 52 has an external diameter which is approximately half that of the support wheel.

Therefore when the vehicle is required to work under extreme and particularly delicate conditions, the guidance element 50 stabilizes the track and prevents its lateral movement in relation to wheel 12.

We now refer to FIG. 4 which constitutes a variant of the previous embodiment. In this case the drive device has four support wheels grouped in pairs; the figure shows the last pair formed by wheels 20C and 20D which are borne by a rocker 68 also referred to as a bogie, articulated on the beam 30 about a shaft 70. It is therefore support wheel 20D which is closest to drive wheel 10. In the example shown the bracket 54 is still firmly attached to beam 30 but is borne by the rocker 68. The bracket is here formed of one piece with the rocker. As a variant the bracket can be borne directly by the beam.

Figure 5:
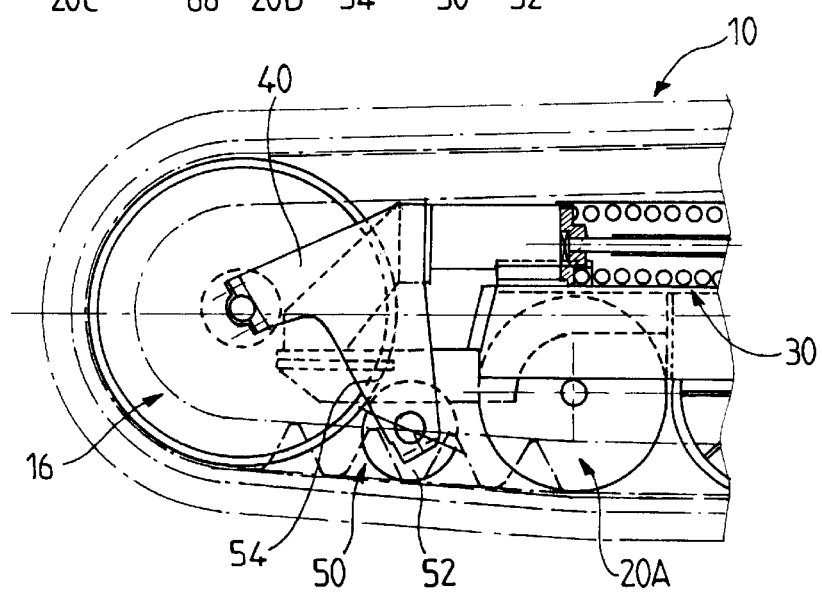
FIG. 5 is a partial side view of a device according to a third embodiment of the invention.

In the embodiment in FIG. 5, the device also or as a variant comprises a similar support wheel 50 provided at the front of the device i.e. between the anterior wheel 16 and the immediately adjacent support wheel 20A. The bracket 54 of the element 50 is attached directly to fork 40 which supports wheel 16.

Thus it is possible to provide a guidance element 50 close to drive wheel 12 and/or a guidance element 50 close to the non-drive wheel 16.

The invention can be applied to various types of wheel and axle sets comprising a greater or lesser number of support wheels. The anterior wheel 16 can if necessary be raised and of smaller diameter than the posterior wheel 12 so as to come into contact with a region of the endless belt which is not in direct contact with the ground when the vehicle is rolling on horizontal ground.

Figure 6:
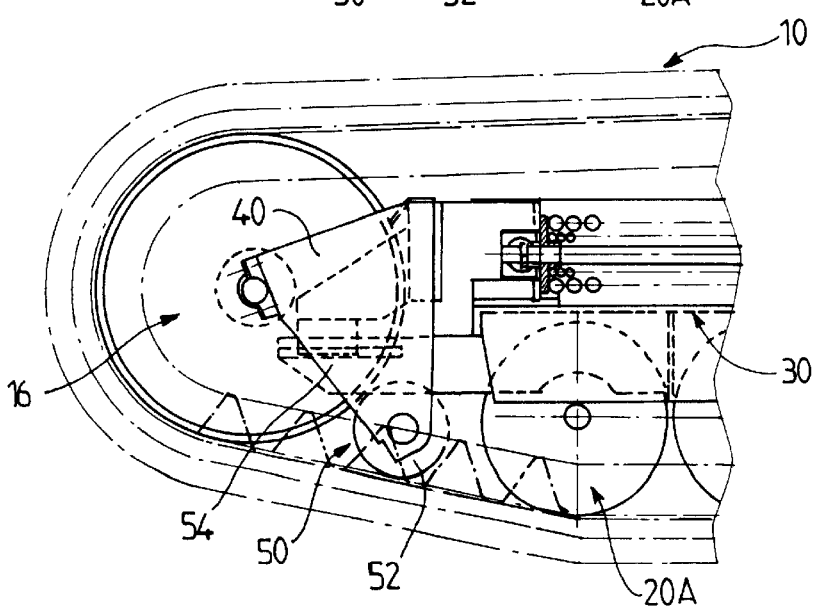
FIG. 6 is a partial side view of a device according to a fourth embodiment of the invention.

FIG. 6 shows an embodiment similar to that of FIG. 5 but in which the anterior wheel 16 is a raised wheel.

The invention can also be applied to tracks comprising for example two rows of studs.

The invention therefore has particular application to all-terrain vehicles and machines, in particular those intended to work under particular difficult conditions.

What is claimed is:

1. A track drive device comprising at least one track (10) formed from an endless flexible belt (22) fitted on the inside with at least one row of studs (24) disposed in the longitudinal direction of the endless belt and spaced at a constant distance (PP) apart and each delimited by two transverse faces (26) in the transverse direction of the endless belt and by two lateral faces (28) in the longitudinal direction of the endless belt, and two main wheels (12, 16) and support wheels (20A, 20B, 20C, 20D) on which the endless belt rolls, wherein the track drive device also comprises a guidance element (50) placed between a main wheel (12, 16) and an adjacent support wheel (20A, 20C, 20D), the guidance element (50) further comprising a plurality of rollers (52) rotatably and loosely mounted about a shaft (xx) and coaxially spaced apart, each of said plurality of rollers having a head (62) in facing relation with another said plurality of roller heads, and said heads being configured to frame the lateral faces (28) of the studs (24) in order to ensure a guidance and stabilization of the endless belt in the region of the guidance element.

2. Device according to claim 1, characterized in that the guidance element (50) is placed between a main drive wheel (12) and an adjacent support wheel (20C, 20D).

3. Device according to claim 1, characterized in that the guidance element (50) is placed between a main non-drive wheel (16) and an adjacent support wheel (20A).

4. Device according to claim 1, in which one (16) of the main wheels and the support wheels (20A, 20B, 20C, 20D) are borne by an oscillating beam (30) mounted pivotally about a shaft (32), characterized in that the guidance element (50) is firmly attached to the said oscillating beam (30).

5. Device according to claim 4, characterized in that the guidance element (50) is borne directly by the oscillating beam (30).

6. Device according to claim 4, in which the support wheels (20A, 20B, 20C, 20D) are grouped in pairs, each pair of which is borne by a rocker (68) articulated on the oscillating beam (30), characterized in that the guidance element (50) is borne by one of the rockers (68).

7. Device according to claim 4, characterized in that the guidance element (50) is situated at an end (34) of the oscillating beam (30) which is close to the articulation shaft (32).

8. Device according to claim 4, characterized in that the guidance element (50) is situated at an end (36) of the oscillating beam (30) which is remote from the articulation shaft (32).

9. Device according to claim 1, characterized in that the heads (62) of the rollers (52) are shaped as a function of the shape of the lateral faces (28) of the studs (24).

10. Device according to claim 1, characterized in that the heads (62) of rollers (52) have a generally truncated part (64) and are each connected to a cylindrical skirt (66).

11. Device according to claim 10 in which the lateral faces (28) of the studs (24) are generally flat and form a given acute angle ($\alpha$) in relation to a plane normal to the endless belt (22), characterized in that the truncated parts (64) of the heads (62) of the rollers (52) form a less acute angle ($\beta$) so as to promote contact of the rollers (52) with the lateral faces (28) of the studs in a region close to the endless belt (22).

12. Device according claim 1, further comprising a bracket (54) having a pair of branches (56) characterized in that the rollers (52) are mounted on two coaxial pivots (58) borne respectively by the pair of branches (56) of said bracket (54).

* * * * *